United States Patent Office 3,488,315
Patented Jan. 6, 1970

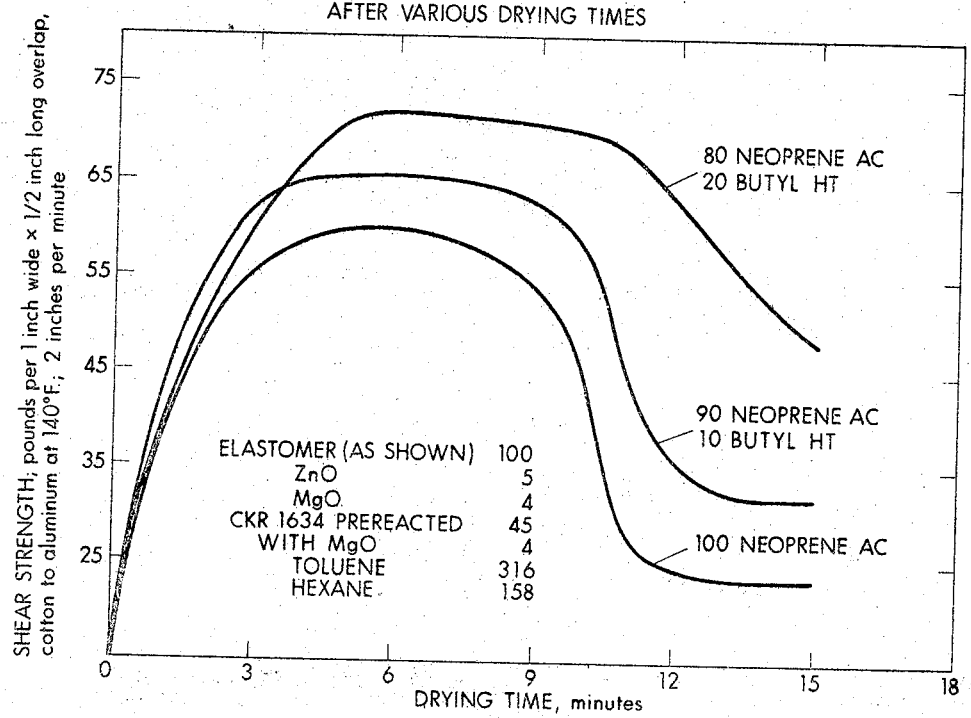
FIGURE I
OPEN TIME AS SHOWN BY CONTACT BOND STRENGTH
AFTER VARIOUS DRYING TIMES
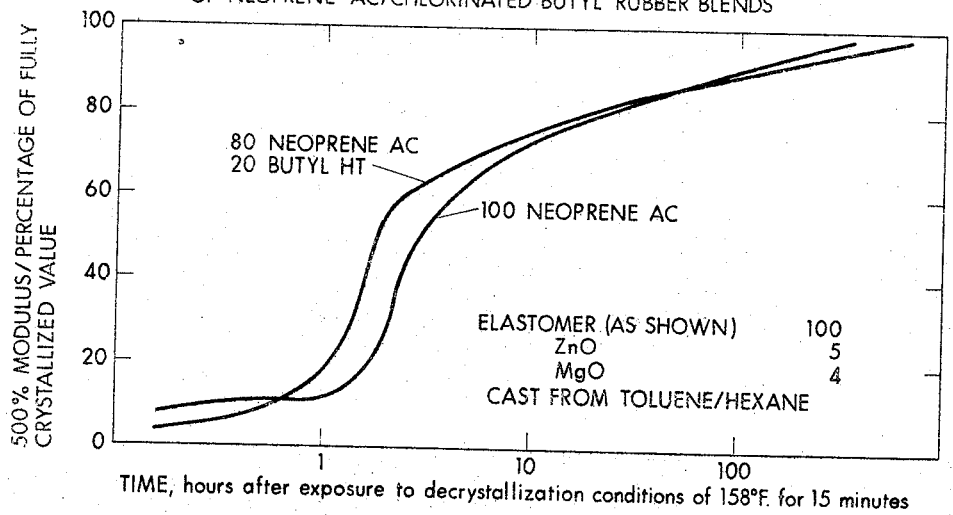
FIGURE II
CRYSTALLIZATION RATE OF CAST FILMS
OF NEOPRENE AC/CHLORINATED BUTYL RUBBER BLENDS

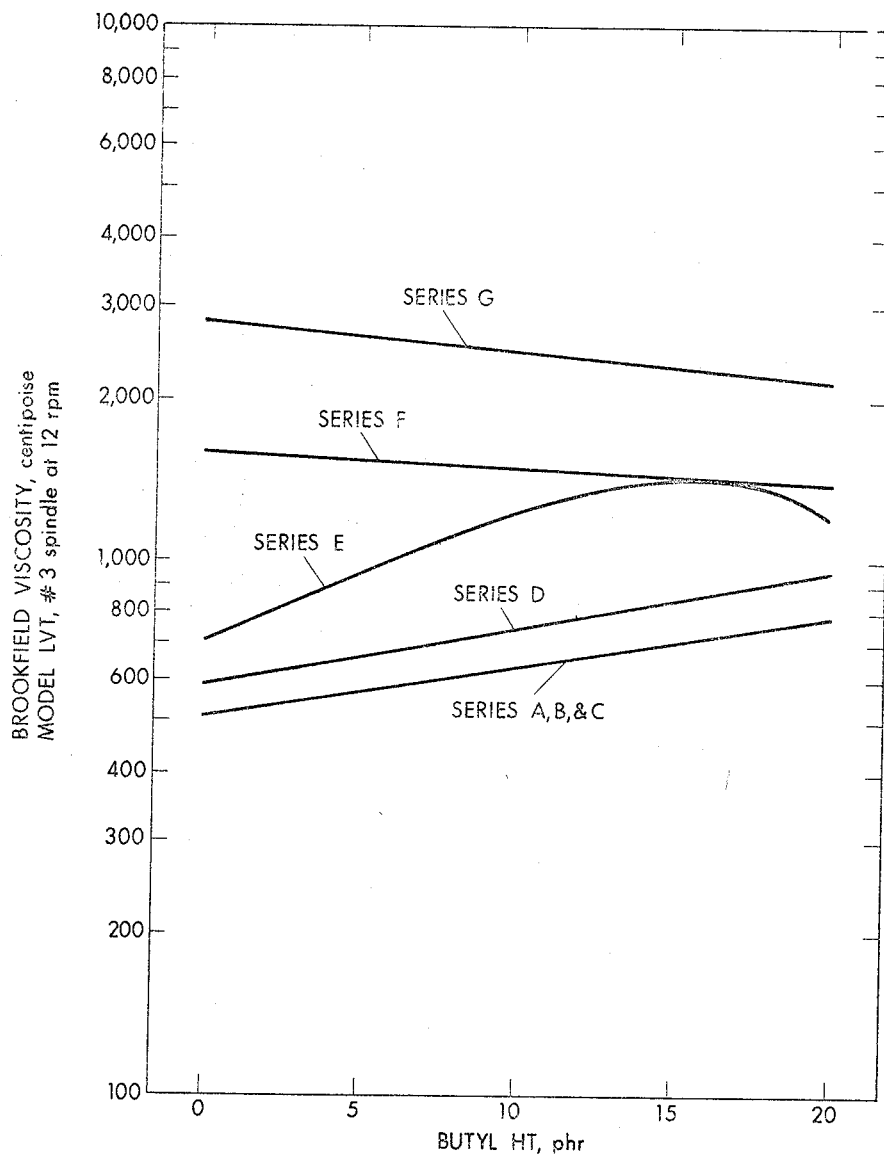
FIGURE III
VISCOSITY OF CONTACT CEMENTS AND MILL BASE SOLUTIONS BASED ON NEOPRENE/CHLORINATED BUTYL RUBBER BLENDS

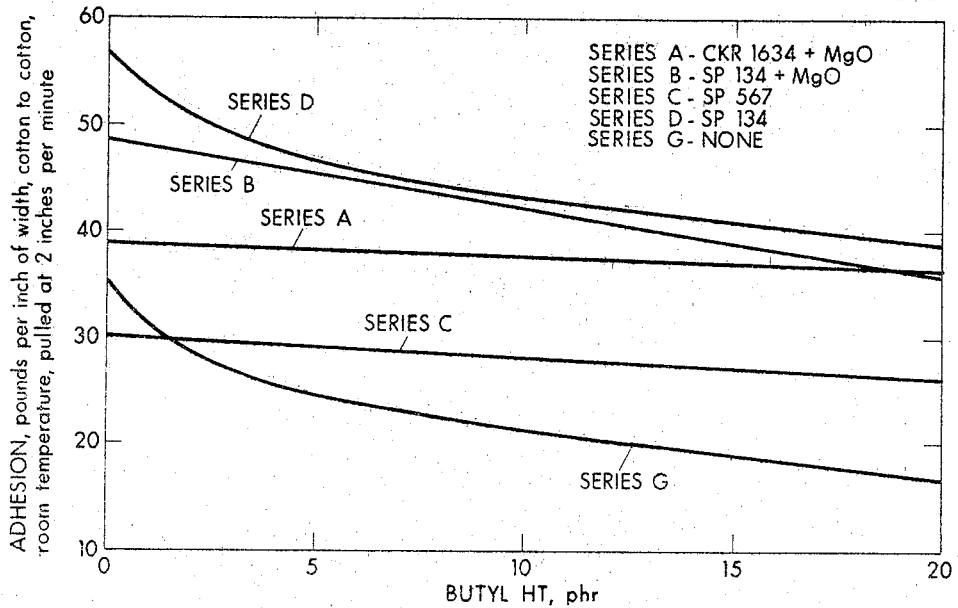
FIGURE IV
T-PEEL ADHESION OF NEOPRENE AC/CHLORINATED BUTYL RUBBER BLENDS CEMENTS
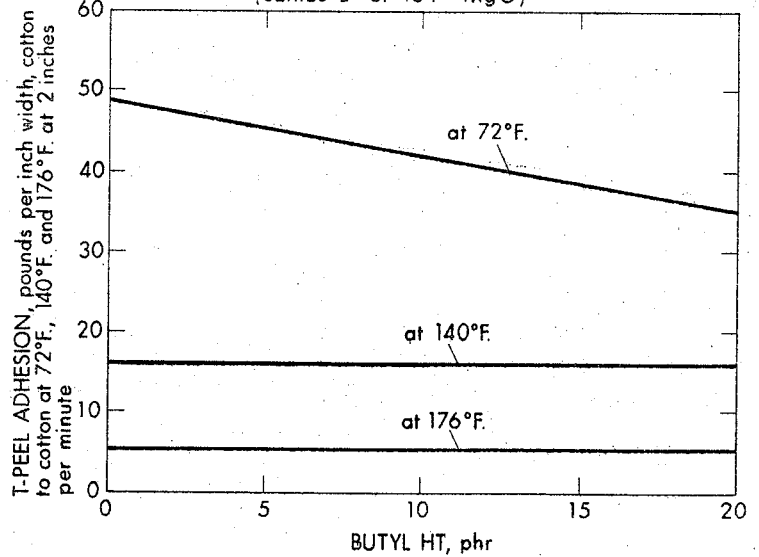
FIGURE V
ADHESION OF NEOPRENE AC/CHLORINATED BUTYL RUBBER BLENDS CEMENTS AT VARIOUS TEMPERATURES
(SERIES B - SP 134 + MgO)

3,488,315
NEOPRENE CEMENTS WITH EXTENDED OPEN TIME
Nova E. Stucker, Westfield, and Anthony J. Berejka, Cranford, N.J., assignors to Esso Research and Engineering Company, a corporation of Delaware
No Drawing. Filed Aug. 9, 1967, Ser. No. 659,506
Int. Cl. C08d 9/08, 9/10; C09j 3/12
U.S. Cl. 260—33.6       22 Claims

ABSTRACT OF THE DISCLOSURE

Open time of polychloroprene/phenol resin solvent based cements is extended by the addition of about 2 to 40 weight percent of chlorinated butyl rubber.

BACKGROUND OF INVENTION

This invention relates to a solvent-containing adhesive cement comprising polychloroprene (i.e. "Neoprene"), phenolformaldehyde resin and chlorinated butyl rubber.

It is common practice to preparate polychloroprene ("Neoprene") cements, for use in bonding to metal or concrete by dissolving neoprene in a suitable solvent and compounding the solvated neoprene with a phenol formaldehyde resin and various alkaline earth oxides such as zinc oxide or magnesium oxide. See for example, U.S. Patent 2,610,910, which is incorporated herein by reference. Improved neoprene cements are prepared by pre-reacting the phenol formaldehyde resin with magnesium oxide. Such modified neoprene cements are described in U.S. patent 2,918,442, which is incorporated herein by reference.

The prior art neoprene cements have the disadvantage of a limited open time. Open time is defined as the time interval, after application of the cement to a surface, during which a second surface can be pressed against the cement and form a good bond.

SUMMARY OF THE INVENTION

Surprisingly, it has been found that the addition of chlorinated butyl (chlorobutyl) rubber to the cement will increase the open time. Additionally, chlorobutyl rubber containing cements crystallize faster and have increased high temperature shear strength.

DETAILED DESCRIPTION

The expression "butyl rubber" as employed in the specification and claims is intended to include copolymers made from a polymerization reaction mixture having therein from 70 to 99.5% by weight of an isoolefin which has about 4 to 7 carbon atoms, e.g. isobutylene and about 30 to 0.5% by weight of a conjugated multiolefin having from about 4 to 14 carbon atoms, e.g. isoprene. The resulting copolymer contains 85 to 99.5% by weight of combined isoolefin and 0.5 to 15% of combined multiolefin.

Butyl rubber generally has a Staudinger molecular weight of about 20,000 to about 500,000, preferably about 25,000 to about 400,000, especially about 100,000 to about 400,000; and a Wijs iodine No. of about 0.5 to 50, preferably 1 to 15. The preparation of butyl rubber is described in U.S. Patent 2,356,128 which is incorporated herein by reference.

Halogenated butyl rubber is commercially available and may be prepared by halogenating butyl rubber in a solution containing between 1 to 60% by weight of butyl rubber in a substantially inert $C_5$–$C_8$ hydrocarbon solvent such as pentane, hexane, heptane, etc. and contacting this butyl rubber cement with a halogen gas for a period of about 25 minutes whereby halogenated butyl rubber and a hydrogen halide are formed, the copolymer containing up to one halogen atom per double bond in the copolymer. The preparation of halogenated butyl rubbers is old in the art, see e.g. U.S. 3,099,644, which is incorporated herein by reference. This invention is not intended to be limited in any way by the manner in which butyl rubber is halogenated and both chlorinated and brominated butyl rubber are suitable for use in this invention. Illustrative of halogenated butyl rubbers is Enjay Butyl HT 1066 (a chlorinated butyl rubber having 1.5 mol percent unsaturation, 1.1–1.3 wt. percent chlorine, and a viscosity-average molecular weight of about 350,000).

The phenol formaldehyde resins suitable for use in this invention are oil soluble resins prepared from monohydric phenols having only two reactive sites. Such resins may be prepared by reacting a para-substituted alkyl phenol with at least a 1:1 ratio of formaldehyde or acetaldehyde to phenol in the presence of an alkaline catalyst. Usually the ratio of aldehyde to phenol is from about 1.2:1 to about 1.6:1 (e.g. see U.S. 2,610,910). Illustrative of such phenol formaldehyde resins are CKR 1634 (Union Carbide Corporation, Bakelite Division) and SP 134 (Schenectady Chemicals, Inc.). For the purposes of this specification, such resins shall be termed heat reactive phenolic resins.

Other phenolic resins which may be used in the practice of this invention are terpene-phenolic resins. Such resins are generally prepared by heat polymerization of $\alpha$-pinene alkylated phenols. Illustrative of such resins is SP 567 (Schenectady Chemicals, Inc.) About 40 to about 200 parts per hundred, preferably about 40 to about 100 phr., e.g. 45 phr., based on the polychloroprene or on the polychloroprene-halogenated butyl blend of a terpene/phenolic resin may be used.

Both alkaline earth oxides and alkaline metal hydroxides are suitable for use in the neoprene cement compositions of this invention. Typically, the hydroxides of sodium, lithium and potassium are effective for this purpose. However, the oxides of zinc and magnesium are preferred, (e.g. see U.S. 2,918,442).

Typical of the solvents suitable for the preparation of a neoprene cement are $C_6$–$C_{10}$ aromatics such as benzene, toluene, xylene and hexane blends thereof; the chlorinated hydrocarbons and petroleum solvents containing high percentages of aromatic and naphthenic constituents. A blend of about 1 part of hexane to about 2 parts of toluene is particularly preferred.

The terms "neoprene" or "polychloroprene" when used in this specification or claims are understood to means polymerized chloroprene and copolymers of chloroprene with minor amounts of other monomers such as isoprene, butadiene, acrylonitrile and the like, the final polymers having the usual neoprene properties well-known in ordinary neoprene commerce (e.g. high insolubility in gasoline).

Typical of commercially available adhesive grade neoprene are neoprene AC (a polychloroprene sol polymer developed for adhesive use, stabilized with thiuram disulfide but containing no sulfur links in the polymer molecule) and neoprene AD (a polychloroprene for adhesives similar to AC but containing no thiuram disulfide) manufactured by E. I. du Pont de Nemours Co., Elastomer Chemicals Department.

Neoprene/phenolic resin adhesives are generally prepared using from 0.5:1 to 2.5:1 parts of neoprene to phenolic resin, (i.e. about 40 to 200 phr. of resin based on neoprene). Preferably about 40 to about 100 phr. (e.g. 45) of resin, based on the neoprene, is used. The alkaline earth oxides and alkali metal hydroxides are incorporated in amounts of about 5 to 30 parts per hundred parts of neoprene. At least 10 to about 200 parts of the alkaline earth oxides should be used to 100 parts of the phenol aldehyde resin. It is common practice to use more than one such alkaline earth oxide. Typically, from about 2 to about 6 parts per hundred, e.g. 5 phr. based on the polychloroprene of zinc oxide may be used with from about 2 to about 10 parts per hundred, e.g. about 4 to about 8 phr. of magnesium oxide based on the polychloroprene.

It has been found that improved cements are produced if at least a part of the alkaline earth oxide is prereacted in solution with the resin, a small amount of water being incorporated therein (e.g. see U.S. 2,918,442). The prereaction conditions are generally room temperature for 18 to 30 hours, e.g. 24 hours.

The chlorinated butyl rubber (Enjay Butyl HT) may be utilized in an amount of about 2.0 to 40 percent by weight; preferably about 2.5 to about 20 percent by weight, based on the chlorinated butyl rubber/neoprene elastomer blend, should be used; most preferably about 10 to about 20 percent by weight of the elastomer blend.

The objectives and advantages of this invention will be more readily apparent by reference to the following examples.

EXAMPLE 1

In order that the expirement could be performed in a controlled manner, standard base blends were prepared. A simple widely quoted neoprene cement formulation was chosen as the basis for investigation (e.g. see U.S. 2,610,910 and Great Britain 790,803).

Mill base: Parts by weight
   Neoprene, adhesive grade _____ 100
   ZnO _____ 5
   MgO _____ 4
Resin Base:
   Heat reactive phenolic resin _____ 45
   MgO _____ 4
   Water _____ 1
   Solvent _____ 300–600

The mill base was prepared by milling the constituents for about 5 minutes on a cool mill. The resin base was prepared by dissolving the resin, at room temperature, in the solvent in the presence of MgO and water and allowing the MgO/resin mixture to react with constant stirring for 24 hours before addition to the mill base.

Resin solution compositions

Series A—Prereacted for 24 hours: Parts by weight
   CKR 1634[1] (heat advancing phenolic) _____ 45
   MgO _____ 4
   Water _____ 1
   Toluene _____ 316
   Hexane _____ 158
Series B—Prereacted for 24 hours: Parts by weight
   SP 134[2] (heat advancing phenolic) _____ 45
   MgO _____ 4
   Water _____ 1
   Toluene _____ 316
   Hexane _____ 158

Series C—No prereaction:
   SP 567[3] (terpene/phenolic tackifier) _____ 45
   Toluene _____ 308
   Hexane _____ 154
Series D—No prereaction:
   SP 134[4] (heat advancing phenolic) _____ 45
   Toluene _____ 308
   Hexane _____ 154

[1] An oil-soluble, heat-reactive, alkylated phenol-formaldehyde resin.
[2] An oil-soluble, heat-reactive, alkylated phenol-formaldehyde resin.
[3] A thermoplastic, oil-soluble terpene-phenolic resin.
[4] An oil-soluble, heat-reactive, alkylated phenol-formaldehyde resin.

Throughout this specification reference to a cement will be made by reference to the resin solution designation. For example, Series A cement refers to a cement prepared by mixing the Series A resin composition with the Mill Base. Where the Mill Base is not used, the complete formulation will be indicated. Unless otherwise specified, the adhesive grade neoprene used is neoprene AC. The amount of Enjay Butyl HT-1066 is in parts per hundred by weight and is substituted for the neoprene. All other weights are based on parts per hundred of elastomer or elastomer blend (i.e. neoprene or neoprene+chlorinated butyl rubber).

EXAMPLE 2

A Series A type neoprene cement was tested to determine the effect of chlorinated butyl rubber (chlorobutyl) on open time.

An aluminum panel was coated with the test cement and after a fixed open time, a cotton or steel test strip was pressed against the adhesive surface. The aluminum-steel test specimens were tested at room temperature for shear strength (ASTM E229–63T) while the aluminum-cotton specimens were tested at 140° F. by the same method. All specimens were tested after drying and being allowed to crystallize at room temperature for about 72 hours. The results of these tests are shown in Table I and FIGURE I.

TABLE I.—SHEAR STRENGTH OF NEOPRENE/BUTYL HT CEMENTS FATER VARIOUS OPEN TIMES

| | | Shear Strength in Pounds | | | | | |
|---|---|---|---|---|---|---|---|
| Series A blend, butyl HT concentration, phr | | 0 | 2.5 | 5 | 10 | 15 | 20 |
| Room Temperature | | | | | | | |
| Aluminum to steel 1 inch wide x ½ inch long overlap | Open time, 3 minutes | 18c | 11c | 11c | 11c | 11c | 9c |
| | Open time, 6 minutes | 12c | 11c | 11c | 10c | 12c | 10c |
| | Open time, 9 minutes | 12ca | 12ca | 12a | 13a | 29a | 18ac |
| | Open time, 12 minutes | 11a | 27a | 21a | 29a | 28a | 23a |
| | Open time, 15 minutes | 16a | 52a | 55a | 34a | 41a | 33a |
| 140° F. | | | | | | | |
| Cotton to aluminum 1 inch wide x ½ inch long overlap | Open time, 3 minutes | 56 | 56 | 52 | 63 | 67 | 53 |
| | Open time, 6 minutes | 60 | 64 | 57 | 49 | 72 | 77 |
| | Open time, 9 minutes | 54 | 53 | 56 | 63 | 74 | 63 |
| | Open time, 12 minutes | 24 | 27 | 54 | 32 | 56 | 66 |
| | Open time, 15 minutes | 24 | 21 | 27 | 33 | 53 | 48 |

All shear tests were pulled at 2 inches per minute. For room temperature results, the "c" indicates a cohesive failure, the "a" designates an adhesion to steel failure. All of the 140° F. results were from cohesive failures.

With open times of greater than 3 minutes, the shear strength of the control (no butyl HT rubber) decreased with time. Conversely, the butyl HT containing blends showed improved strength at 6 and 9 minutes open times. Further, there was no loss in shear strength up to levels of about 20 parts butyl HT. In fact at elevated temperatures (ca. 140° F.) the results indicate an increase in shear strength.

EXAMPLE 3

Neoprene cements owe their good bond strength to rapid crystallization at room temperature. Consequently, it is of interest to know the effect of chlorinated butyl rubber on the crystallization rate and ultimate crystallinity of the cement. In order to determine the effect of chlorinated butyl rubber (butyl HT) on crystallinity, films were prepared and tested at various times after subjecting the film to a decrystallization cycle of 15 minutes at 158° F. The following formulation (designated Series E) was made up and used to cast 10 mil films.

Series E—Cement: Parts by weight
- Elastomer [1] _____ 100
- ZnO _____ 5
- MgO _____ 4
- Hexane _____ 218
- Toluene _____ 218

[1] Neoprene or Neoprene+Butyl HT.

The moduli for various compositions were determined at 500 and 1000% elongation and used to determine the percent of ultimate modulus attained at various time intervals, shown in Table II and FIGURE II. From these data, it is evident that butyl HT has no adverse effect on the rate of crystallization of neoprene cement. Although for very short times (i.e. less than one hour) chlorobutyl containing compounds have lower moduli, the onset of crystallization occurs sooner, as does the attainment of 50 or 60% of ultimate value (FIG II).

TABLE II.—RATE OF CRYSTALLIZATION OF NEOPRENE/BUTYL HT BLENDS

| | | Dried Films Cast From Series E Cement | | | | | |
|---|---|---|---|---|---|---|---|
| Butyl HT Concentration, phr | | 0 | 2.5 | 5 | 10 | 15 | 20 |
| | Crystallization Time | | | | | | |
| Percent of ultimate 500% modulus attained | ½ hour | 10 | 9 | 5 | 6 | 5 | 5 |
| | 1 hour | 11 | 6 | 6 | 7 | 16 | 19 |
| | 2 hours | 27 | 38 | 41 | 45 | 53 | 57 |
| | 4 hours | 59 | 59 | 62 | 63 | 65 | 66 |
| | 26 hours | 82 | 83 | 80 | 79 | 79 | 80 |
| | 93 hours | 92 | 89 | 91 | 91 | 88 | 88 |
| | 336+ hours | 100 | 100 | 100 | 100 | 100 | 100 |
| Percent of ultimate 1,000% modulus attained | ½ hour | 21 | 9 | 5 | 7 | 4 | 5 |
| | 1 hour | 23 | 10 | 10 | 11 | 22 | 28 |
| | 2 hours | 50 | 53 | 52 | 59 | 64 | 64 |
| | 4 hours | 72 | 69 | 68 | 71 | 67 | 77 |
| | 26 hours | 94 | 87 | 85 | 84 | 85 | 86 |
| | 93 hours | 100 | 98 | 93 | 96 | 92 | 92 |
| | 336+ hours | 100 | 100 | 100 | 100 | 100 | 100 |

EXAMPLE 4

From the practical use standpoint, it is of interest to know the effect of chlorobutyl containing compositions on cement viscosity. The Brookfield viscosity of various blends was determined for various levels of butyl HT. In addition to series A, B, C, D and E, two other blends, F and G, were also tested. Series F is similar to Series E except that the solvent is all toluene rather than a hexane-toluene mixture. Series G is identical to Series F except that neoprene AD is substituted for neoprene AC. The results of this study are shown on FIGURE III.

As can be seen, the viscosity change due to butyl HT is small and the trend can be reversed by the choice of solvents. Thus, the solutions in toluene show a slight viscosity decrease with chlorobutyl content while those in a 2:1 blend of toluene/hexane increase somewhat. Apparently, at some smaller proportion of hexane, the curve would be flat. In other systems there may be more effect but this can be compensated for with simple solvent system modification.

EXAMPLE 5

The Brookfield viscosity of Series A, C and D cements (Example 1) was checked at 100 days and the ratio of 100 day viscosity to initial viscosity was determined. These data are tabulated in Table III.

TABLE III.—VISCOSITY STABILITY
[Ratio of Brookfield Viscosities Taken at 100 Days and Taken at 24 hours]

| | Chlorobutyl Content, phr. | | | | | |
|---|---|---|---|---|---|---|
| Resin | 0 | 2.5 | 5 | 10 | 15 | 20 |
| CKR 1634 | 1.75 | 1.72 | 1.35 | 1.63 | 1.53 | 1.85 |
| SP 567 | 2.11 | 2.33 | 2.20 | 2.14 | 2.08 | 1.87 |
| SP 134 | 1.75 | 1.85 | 1.80 | 1.69 | 1.46 | 1.42 |

An examination of the reported ratios indicates that there is no apparent tendency for the systems with chlorinated butyl rubber to change more than the control.

EXAMPLE 6

The room temperature adhesion of neoprene cement Series A, B, C, D of Example 1 and Series G of Example 4 was measured using the T-Peel adhesion test (ASTM D-1876-61T) on cotton to cotton test specimens. The effect of butyl HT content is shown in FIGURE VI. The Peel adhesion strength is generally reduced with increasing butyl HT content.

EXAMPLE 7

In order to determine the effect of colorinated butyl rubber on the T-Peel adhesion at various temperatures, Series B cement (Example 1) was tested at three temperature (72° F., 140° F., and 176° F.) for various levels of chlorinated butyl rubber (butyl HT). The data are presented in Table IV and FIGURE V. At elevated temperatures there is a slight but definite upward trend in T-Peel adhesion with increasing chlorobutyl content.

TABLE IV.—ADHESIONS OF A NEOPRENE/BUTYL HT CEMENT SERIES AT THREE TEMPERATURES (POUNDS/INCH)
[Resin Solution B, Prereacted SP 134]

| | Temperature | | |
|---|---|---|---|
| | 75° F. | 140° F. | 176° F |
| Butyl HT concentration, phr.: | | | |
| 0 | 49 | 17 | 4.9 |
| 2.5 | 47 | 14 | 5.4 |
| 5 | 42 | 13 | 6.8 |
| 10 | 45 | 14 | 5.2 |
| 15 | 39 | 17 | 6.0 |
| 20 | 35 | 15 | 5.8 |

Adhesion was determined on one-inch wide bonded cotton cloth. T-Peel pulled at 2 inches/minute.

The results of these experiments show that the open time of a neoprene cement may be extended by the addition of minor amounts of chlorinated butyl rubber. At the same time, high temperature shear strength is improved and crystallization takes place at a faster rate. Since many different embodiments of this invention may be made without departing from the spirit and scope thereof, it is to be understood that the present invention is not limited to the specifically disclosed examples thereof.

What is claimed is:
1. An adhesive cement which comprises:
(a) an elastomer blend comprising about 2 to about 40 weight percent of a halogenated butyl rubber selected from the group consisting of brominated butyl rubber and chlorinated butyl rubber, the remainder of the blend comprising polychloroprene elastomer;
(b) an alkaline earth oxide;
(c) a phenol formaldehyde resin of the alkaline catalyzed reaction product of a para-substituted phenol and formaldehyde; and

(d) an inert solvent selected from the group consisting of hydrocarbons, chlorinated hydrocarbons and mixtures thereof.

2. The adhesive cement of claim 1 wherein:
   (a) the alkaline earth oxide is present at about 5 to about 30 parts per hundred based on the elastomer blend; and
   (b) the phenol formaldehyde resin is present at about 40 to about 200 parts per hundred based on the elastomer blend.

3. The composition of claim 2 wherein the alkaline earth oxide is magnesium oxide, zinc oxide, or mixtures thereof and the halogenated butyl rubber is a chlorinated butyl rubber present in about 10 to about 20 weight percent based on the elastomer blend.

4. The composition of claim 3 wherein the inert solvent comprises a solution of toluene and hexane in a 2:1 ratio.

5. A process for preparing a polychloroprene elastomer cement which comprises:
   (a) milling together an elastomer blend comprising about 2 to about 40 weight percent of a halogenated butyl rubber selected from the group consisting of brominated butyl rubber and chlorinated butyl rubber and about 98 to about 60 weight percent polychloroprene elastomer with
      (1) about 2 to about 6 parts per hundred, based on the elastomer, of zinc oxide, and
      (2) about 2 to about 10 parts per hundred, based on the elastomer, of magnesium oxide;
   (b) preparing a solvent mix comprising
      (1) about 300 to about 600 parts per hundred, based on the elastomer blend, of an inert solvent selected from the group consisting of hydrocarbons, chlorinated hydrocarbons and mixtures thereof,
      (2) about 40 to about 200 parts per hundred, based on the elastomer blend, of a heat reactive phenolic resin,
      (3) about 2 to about 10 parts per hundred, based on the elastomer blend, of magnesium oxide, and
      (4) about 1 part per hundred, based on the elastomer blend, of water;
   (c) blending the solvent mix for a period of time sufficient to react the phenolic resin and the magnesium oxide; and
   (d) blending the milled elastomer blend into the solvent mix.

6. The process of claim 5 wherein:
   (a) about 5 parts per hundred of zinc oxide and 4 parts per hundred of magnesium oxide, based on the elastomer blend, are milled into an elastomer blend containing about 10 to about 20 weight percent chlorinated butyl rubber; and
   (b) about 45 parts per hundred of phenolic resin, about 4 parts per hundred of magnesium oxide and 1 part per hundred of water are prereacted for a period of about 18 to about 30 hours in the inert solvent, all weights being based on the elastomer blend.

7. A solvent-containing polychloroprene cement composition which comprises
   (a) an elastomer blend comprising about 2 to about 40 weight percent of a halogenated butyl rubber selected from the group consisting of brominated butyl rubber and chlorinated butyl rubber and about 98 to about 60 weight percent polychloroprene elastomer dissolved in about 300 to about 600 parts per hundred based on the elastomer blend of an inert solvent selected from the group consisting of hydrocarbons, chlorinated hydrocarbon solvents and mixtures thereof;
   (b) about 2 to about 6 parts per hundred based on the elastomer blend of zinc oxide;
   (c) about 2 to 10 parts per hundred, based on the elastomer blend of magnesium oxide;
   (d) about 40 to about 200 parts per hundred based on the elastomer blend of a terpene/phenolic resin.

8. The composition of claim 7 wherein:
   (a) the elastomer blend is comprised of about 10 to about 20 weight percent of a chlorinated butyl rubber and about 90 to about 80 weight percent of polychloroprene elastomer;
   (b) the zinc oxide is present in about 5 parts per hundred, based on the elastomer blend;
   (c) the magnesium oxide is present in about 4 parts per hundred, based on the elastomer blend, and
   (d) the terpene/phenolic resin is present in about 45 parts per hundred, based on the elastomer blend.

9. The composition of claim 8 wherein the inert solvent comprises a solution of toluene and hexane in a 2:1 ratio.

10. An adhesive cement comprising:
    (a) a polychloroprene elastomer;
    (b) about 2 to about 40 weight percent halogenated butyl rubber selected from the group consisting of brominated butyl rubber and chlorinated butyl rubber, said weight percent being based on said elastomer plus butyl rubber;
    (c) a solvent; and
    (d) an alkaline earth oxide.

11. The composition of claim 10 wherein the halogenated butyl rubber is present in about 10 to about 20 weight percent.

12. The composition of claim 10 wherein the cement contains a phenolic resin selected from the group consisting of (1) a phenol formaldehyde resin of the alkaline catalyzed reaction product of a para-substituted phenol and formaldehyde, (2) a terpene phenolic resin, and (3) $\alpha$ pinene phenolic resins.

13. The composition of claim 12 wherein the cement contains an alkaline earth oxide.

14. The composition of claim 13 wherein the solvent comprises a solution of toluene and hexane in a 2:1 ratio.

15. The composition of claim 1 wherein the halogenated butyl rubber is a chlorinated butyl rubber.

16. The process of claim 5 wherein the halogenated butyl rubber is a chlorinated butyl rubber.

17. The composition of claim 7 wherein the halogenated butyl rubber is a chlorinated butyl rubber.

18. The cement of claim 10 wherein the halogenated butyl rubber is a chlorinated butyl rubber.

19. The composition of claim 1 wherein the rubber has an iodine number of about 1 to about 15.

20. The process of claim 5 wherein the rubber has an iodine number of about 1 to about 15.

21. The composition of claim 7 wherein the rubber has an iodine number of about 1 to about 15.

22. The composition of claim 10 wherein the rubber has an iodine number of about 1 to about 15.

References Cited

UNITED STATES PATENTS

| | | | |
|---|---|---|---|
| 2,918,442 | 12/1959 | Gerrard et al. | 260—38 |
| 3,086,951 | 4/1963 | Wile. | |
| 3,163,626 | 12/1964 | Minckler et al. | 260—888 |
| 3,185,658 | 5/1965 | Garrett | 260—845 |
| 3,250,733 | 5/1966 | Giller | 260—888 |
| 3,342,789 | 9/1967 | Bannister | 260—888 |
| 3,351,572 | 11/1967 | Jameson | 260—33.6 |

JAMES A. SEIDLECK, Primary Examiner

SAMUEL L. FOX, Assistant Examiner

U.S. Cl. X.R.

260—33.8, 38, 41.5, 845, 847